(12) United States Patent
Riemer et al.

(10) Patent No.: US 7,389,898 B2
(45) Date of Patent: Jun. 24, 2008

(54) SPARE-WHEEL CARRIER FOR A MOTOR VEHICLE

(75) Inventors: Holger Riemer, Bergfeld (DE); Frank Babel, Wasbuettel (DE); Oliver Burnus, Gross Oesingen (DE)

(73) Assignee: Volkswagon AG, Wolfsburg (DE)

( * ) Notice: Subject to any disclaimer, the term of this patent is extended or adjusted under 35 U.S.C. 154(b) by 294 days.

(21) Appl. No.: 10/671,927

(22) Filed: Sep. 26, 2003

(65) Prior Publication Data

US 2004/0124223 A1    Jul. 1, 2004

(30) Foreign Application Priority Data

Dec. 30, 2002  (DE) ............... 202 20 177 U
Mar. 13, 2003  (DE) ............... 203 04 381 U

(51) Int. Cl.
*B60R 9/06* (2006.01)
*B62D 43/02* (2006.01)
*B60K 28/10* (2006.01)

(52) U.S. Cl. ............... 224/509; 224/42.13; 340/426.34; 340/438; 180/286

(58) Field of Classification Search ............... 224/509, 224/502, 488, 511, 42.28, 42.12–13; 307/10.3; 180/275–279, 286; 340/426.34, 438, 426.28; 296/37.2
See application file for complete search history.

(56) References Cited

U.S. PATENT DOCUMENTS

| | | | | |
|---|---|---|---|---|
| 2,576,017 A * | 11/1951 | Jeffrey et al. | ............... | 340/438 |
| 3,697,943 A * | 10/1972 | Andres | ............... | 340/457 |
| 3,805,231 A * | 4/1974 | Santoli | ............... | 307/10.3 |
| 3,883,844 A * | 5/1975 | Wood, II | ............... | 340/438 |
| 4,278,968 A * | 7/1981 | Arnett et al. | ............... | 340/686.6 |
| 4,583,072 A * | 4/1986 | Matsushita | ............... | 340/457 |
| 4,597,354 A * | 7/1986 | Gelula | ............... | 114/343 |
| 4,803,760 A * | 2/1989 | Gelula | ............... | 24/631 |
| 5,186,371 A * | 2/1993 | Jozefczak et al. | ............... | 224/42.21 |
| 5,522,530 A * | 6/1996 | Boettcher | ............... | 224/488 |
| 5,564,611 A * | 10/1996 | Weiler | ............... | 224/502 |
| 5,602,526 A * | 2/1997 | Read | ............... | 340/457 |
| 5,656,990 A * | 8/1997 | Schwimmer | ............... | 340/426.28 |
| 5,713,501 A * | 2/1998 | Yokoyama et al. | ............... | 224/517 |
| 5,791,533 A * | 8/1998 | Neag et al. | ............... | 224/42.21 |
| 5,907,284 A * | 5/1999 | Israel | ............... | 340/686.1 |
| 6,067,026 A * | 5/2000 | Weimer et al. | ............... | 340/686.6 |
| 6,137,419 A * | 10/2000 | Lennox et al. | ............... | 340/687 |
| 6,561,489 B1 * | 5/2003 | Wakefield | ............... | 254/323 |
| 6,669,066 B2 * | 12/2003 | Eberle et al. | ............... | 224/509 |

(Continued)

FOREIGN PATENT DOCUMENTS

DE     4119579 A1 * 12/1992

(Continued)

*Primary Examiner*—Nathan J Newhouse
*Assistant Examiner*—Justin M Larson
(74) *Attorney, Agent, or Firm*—Kenyon & Kenyon LLP

(57) ABSTRACT

A spare-wheel carrier for a motor vehicle is pivotable at a body of the motor vehicle and arranged in a region of a tailgate of the motor vehicle. The spare-wheel carrier includes at least one sensor configured to detect at least one position of the spare-wheel carrier and to transmit the at least one position to a control unit. The control unit is configured to enable and block at least one function of the motor vehicle in accordance with the position of the spare-wheel carrier.

12 Claims, 8 Drawing Sheets

U.S. PATENT DOCUMENTS

| | | | |
|---|---|---|---|
| 6,676,186 B2 * | 1/2004 | Greif | 296/50 |
| 6,701,913 B1 * | 3/2004 | LeDuc et al. | 126/276 |
| 6,712,171 B2 * | 3/2004 | Farmer | 180/286 |
| 6,718,235 B1 * | 4/2004 | Borugian | 701/1 |
| 6,727,806 B1 * | 4/2004 | Massie et al. | 340/426.24 |
| 6,737,960 B2 * | 5/2004 | Preston | 340/426.1 |
| 6,753,787 B2 * | 6/2004 | Cole | 340/686.1 |
| 6,796,466 B2 * | 9/2004 | Essig | 224/42.21 |
| 6,825,760 B2 * | 11/2004 | Sawyer et al. | 340/463 |
| 6,889,881 B2 * | 5/2005 | Wilkens | 224/509 |
| 7,059,159 B2 * | 6/2006 | Lanigan et al. | 70/280 |
| 7,081,812 B2 * | 7/2006 | Hastings, Sr. | 340/456 |
| 7,128,019 B2 * | 10/2006 | Hensel | 116/35 R |
| 2003/0201876 A1 * | 10/2003 | Stegman et al. | 340/433 |

FOREIGN PATENT DOCUMENTS

| | | | |
|---|---|---|---|
| DE | 19801274 A1 * | 7/1999 | |
| DE | 19959990 A1 * | 6/2000 | |
| EP | 1388633 A1 * | 2/2004 | |
| GB | 2340178 A * | 2/2000 | |

* cited by examiner

SPARE-WHEEL CARRIER FOR A MOTOR VEHICLE

CROSS-REFERENCE TO RELATED APPLICATIONS

The present application claims priority to Application No. 202 20 177.5, filed in the Federal Republic of Germany on Dec. 30, 2002, and Application No. 203 04 381.2, filed in the Federal Republic of Germany on Mar. 13, 2003, each of which is expressly incorporated herein in its entirety by reference thereto.

FIELD OF THE INVENTION

The present invention relates to a spare-wheel carrier for a motor vehicle.

BACKGROUND INFORMATION

In the branch of off-road motor vehicles, it is believed to be conventional that a spare wheel can be mounted outside of the motor vehicle, e.g., in the region of a tailgate. Due to the positioning of the spare wheel in the rear section with the aid of a spare-wheel carrier, the tailgate is only partially accessible or inaccessible as long as the spare wheel is attached. Therefore, it is believed to be conventional that the spare-wheel carrier can be pivoted at the body to swivel it from a position nearly parallel to the tailgate to a position of nearly 90° or more, in order to thereby obtain unencumbered access to the tailgate. However, the tailgate and/or the spare-wheel carrier are often damaged, because, for example, the tailgate is opened, but the spare-wheel carrier is still in a position where it collides with the opened tailgate.

Therefore, it is an aspect of the present invention to provide a spare-wheel carrier, where collisions with other vehicle parts or other damage to the spare-wheel carrier may be prevented.

SUMMARY

The above and other beneficial aspects of the present invention may be achieved by providing a spare wheel carrier as described herein. Additional aspects of the present invention are also described herein.

To this end, at least one position of the spare-wheel carrier may be detectable and transmittable to a control unit with the aid of a sensor, functions of the motor vehicle being able to be unblocked or blocked as a function of the position of the spare-wheel carrier. In this context, a sensor is generally to be understood as both a sensory system and a switch, by which a position of the spare-wheel carrier may be detectable. Examples of the functions, which are unblocked or blocked, may include access options, operating functions, driving functions, etc. For example, access to or the enabling of the tailgate, the opening of the rear window, the starting or driving-off of the motor vehicle, etc. may be made a function of the position of the spare-wheel carrier. This enabling or blocking may be directly accomplished by the control unit, or the control unit may transmit the position of the spare-wheel carrier to other control units. To this end, the control units may be interconnected by a CAN or LIN bus, or the control unit may transmit its information via a gateway to control units situated in other bus systems.

In an example embodiment, the position of the spare-wheel carrier may be represented on a display unit, the display unit, e.g., taking the form of an instrument cluster. This may allow the motor-vehicle driver to rapidly and clearly receive the information about the position of the spare-wheel carrier at a usual location, since he or she may normally receive a display of the position of doors and tailgates in the instrument cluster.

In an example embodiment, the spare-wheel carrier may be lockable. This may ensure that the spare-wheel carrier does not move, in particular, during an off-road trip. By having the position of the spare-wheel carrier represented on the display unit, the driver may be informed, prior to starting a trip, whether or not the spare-wheel carrier is locked, so that he may take appropriate measures to prevent it from swinging out during the trip.

In an example embodiment, the sensor may take the form of a lock having a touch-sensitive switch, a position of the spare-wheel carrier being detectable by the touch-sensitive switch, and the spare-wheel carrier being lockable by the lock. In the simplest case, the touch-sensitive switch may detect the position, "Spare-wheel carrier locked?"

In an example embodiment, the lock may be assigned an actuator, which may be manipulable with the aid of a grip switch. The actuator may take the form of an electric motor, which may be energized and unlock the lock in response to manipulation of the grip switch. Accordingly, the motor may be energized, when the touch-sensitive switch detects that the spare-wheel carrier has been swung into the position for locking.

In another example embodiment, the lock for locking may be arranged to have at least two locking elements, one locking element being attached to the body of the vehicle, e.g., to a tailgate, and a complimentary locking element being attached to the spare-wheel carrier. One locking element may include a striker, the striker being arranged to have a ball and a pin. The complimentary locking element may include at least two hinged ball sockets, which may receive the ball of the striker. The striker may rotate in the ball sockets, thereby allowing an effective adjustment for tolerance. Due to spatial considerations, the locking element, including the ball sockets, may be attached to the spare-wheel carrier.

The striker may be supported in a further ball. In this manner, the striker is not rigidly fastened, but may be swivelled about its transverse axes to compensate for tolerance.

In an example embodiment, the swivelling of the ball sockets from a closed position into an open position may be blocked by a movable blocking part, the locking element being unlocked by displacing and/or tilting the blocking part. In the open position, the ball sockets are in a stable equilibrium position. When the ball of the striker is received by the ball sockets, the ball sockets are swivelled about assigned axes and assume a closed position. In the closed position, and/or in the event of a movement into the closed position, a blocking element is moved and/or tilted between the ball sockets in such manner, that the ball sockets are prevented from swinging back into the open position. The blocking element may be swivelled and/or tilted into the locked position by spring forces.

In an example embodiment, the ball sockets may be held in a closed position by a catch hook, using its own weight. Due to their own weight, the catch hooks load the ball sockets and, in this manner, prevent the ball sockets from swinging back into the open position.

In an example embodiment, a release device may be arranged to have at least one lever, the lever being operable by an actuator and/or manually. An example embodiment having a lever mechanism may mimic the unlocking device in a simple manner.

In an example embodiment, the lock may be arranged to have an emergency release device that includes an emergency release lock, the spare-wheel carrier being manually releasable by the emergency release device. In this context, the emergency release lock includes a striker having at least one rotatable actuator, the actuator being rotatable into at least an unlocked and a locked position, and, in the unlocked position, the lever for unlocking the spare-wheel carrier being driven by displacing the striker, and, in a locked position, the lever for unlocking the spare-wheel carrier not being driven by displacing the striker.

In an example embodiment, the emergency release device may include a least one lever, the lever being positioned in such a manner, that at least one lever for releasing the spare-wheel carrier may be actuated by the lever. This may allow various mechanisms of the lock to be simultaneously released, and rapid access is therefore possible in emergency situations.

In an example embodiment, at least one bearing of the spare-wheel carrier on the body may be assigned an end switch. A specific, swung-open position of the spare-wheel carrier may be detectable with the aid of the end switch.

In an example embodiment, the tailgate may be assigned an additional grip switch, the tailgate being operable as a function of the spare-wheel carrier position detected by the end switch. Therefore, it may be ensured that the tailgate is only released when the spare-wheel carrier is swivelled out far enough to prevent a collision with the tailgate to be swung open. In this context, the end switch is preassigned a specific angular position at which the contact closes, this angular position not necessarily having to be the actual end position of the spare-wheel carrier.

In an example embodiment, the operation of the rear window may be blocked when a locked spare-wheel carrier is detected.

The present invention is described below on the basis of exemplary embodiments.

DETAILED DESCRIPTION

Figure 1:
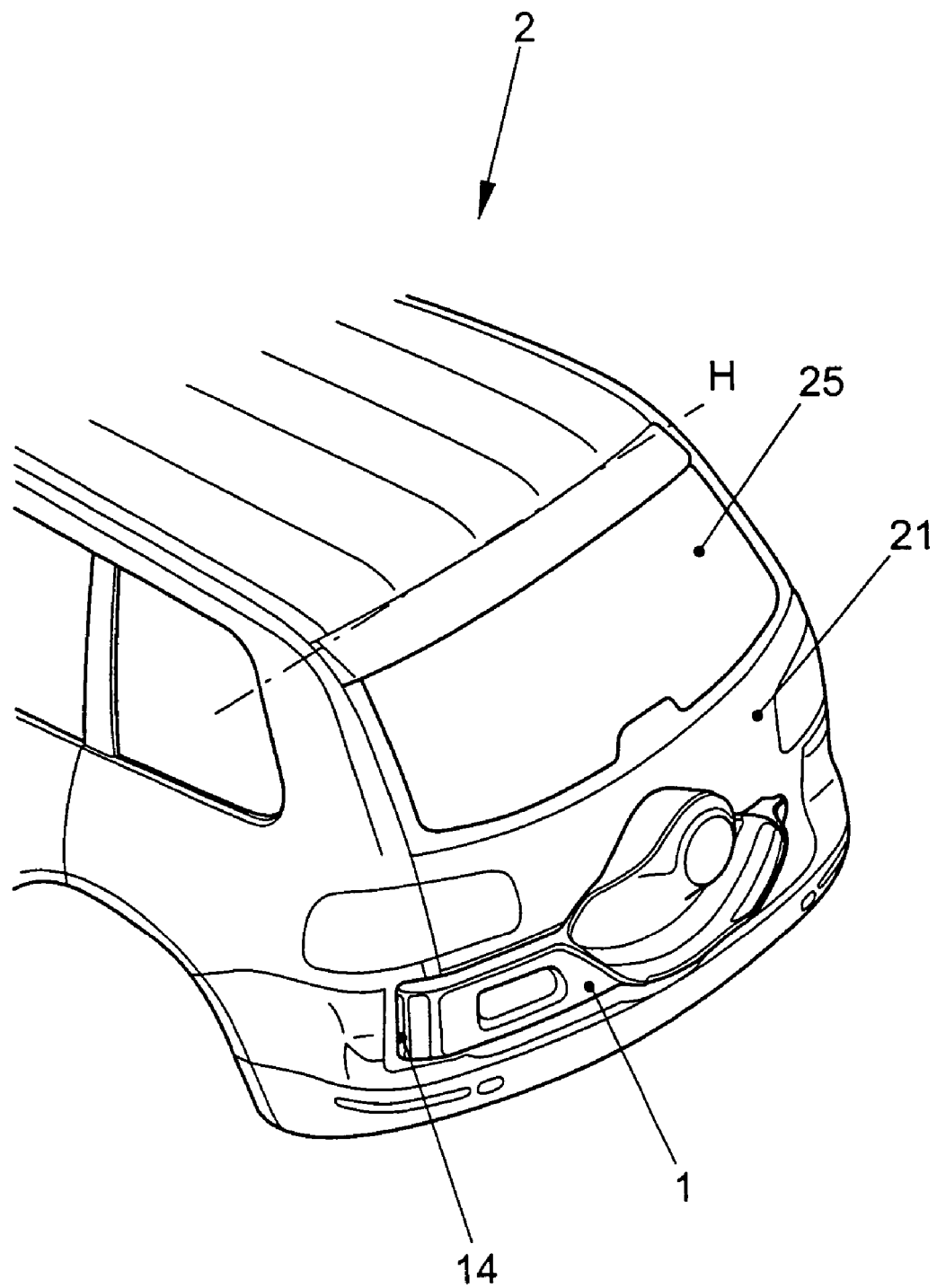
FIG. 1 is a perspective view of a spare-wheel carrier on the rear end of a vehicle.

In all of the figures, the same reference numerals are used for identical component parts.

A rear end 2 of a vehicle, including a tailgate 21, a rear window 25, and a spare-wheel carrier 1, is illustrated in FIG. 1. In the represented, locked state, spare-wheel carrier 1 rests on tailgate 21 and is attached to tailgate 21 by a lock. In the locked position of spare-wheel carrier 1, one is blocked from opening tailgate 21 via a rotating motion about axis H. In addition to tailgate 21, rear window 25 may also be controlled as a function of the position of spare-wheel carrier 1. For example, it may be provided that rear window 25 only be able to be opened when spare-wheel carrier 1 is swung out. However, it is also possible to allow rear window 25 to be opened in the case of a swung-back spare-wheel carrier 1 not having a spare wheel, using, e.g., an appropriate signal of a radio remote control.

Figure 2:
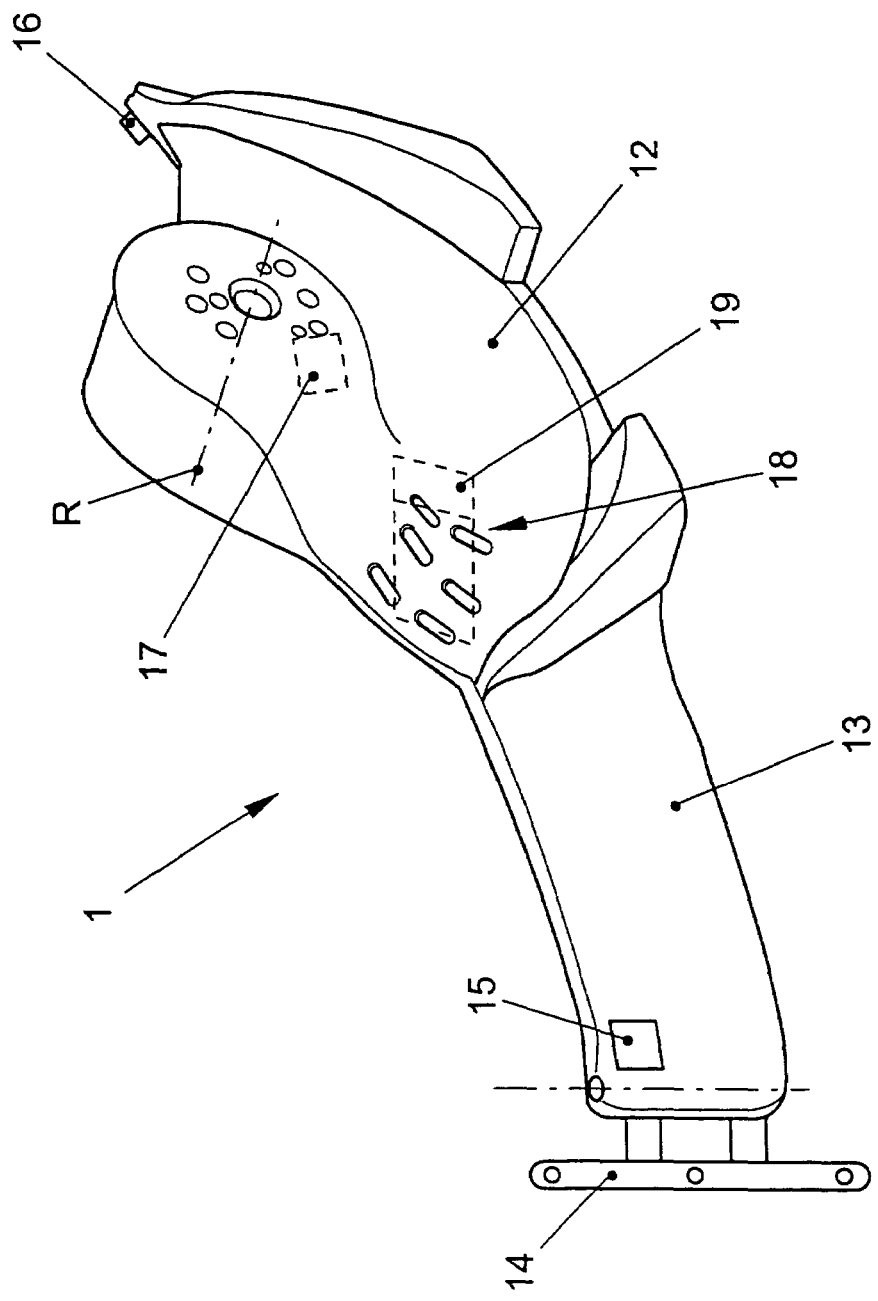
FIG. 2 is a perspective view of the spare-wheel carrier.

Spare-wheel carrier 1 is illustrated in FIG. 2. Spare-wheel carrier 1 includes a carrier part 12 for mounting a spare wheel on an axis R. Carrier part 12 has a swivel arm 13, via which carrier part 12 is pivoted in a bearing 14. Bearing 14 is attached to vehicle rear end 2 shown in FIG. 1, using suitable fastening device. In this context, instead of one swivel arm 13, models having two or more swivel arms are, in principle, also possible. Situated in bearing 14 is a hidden end switch 15, which is connected to a control unit. End switch 15 is visible, for example, in FIG. 5. Carrier part 12 is arranged to have a grip switch 16, an actuator 17 represented by hidden lines, and a lock 18, which has a touch-sensitive switch 19 and is represented by hidden lines. Spare-wheel carrier 1 may be fastened to the body of the motor vehicle by lock 18. Grip switch 16 and touch-sensitive switch 19 are connected to the control unit, as well.

In order to now get at tailgate 21, which is at least partially covered by spare-wheel carrier 1, one initially manipulates grip switch 16. This manipulation of grip switch 16 is transmitted to the control unit. The control unit triggers actuator 17, which consequently unlocks lock 18. In addition to the unlocking, it may also be provided that carrier part 12 be moved into a pre-locking position. The user may swing open carrier part 12 in the direction of bearing 14, until carrier part 12 is in a desired position. At or beyond a preset angular position of, e.g., 90°, end switch 15 closes and transmits this status to the control unit, which consequently enables tailgate 21 to be opened. In addition to the position of spare-wheel carrier 1, the enabling of tailgate 21 is normally a function of other conditions.

Figure 3:
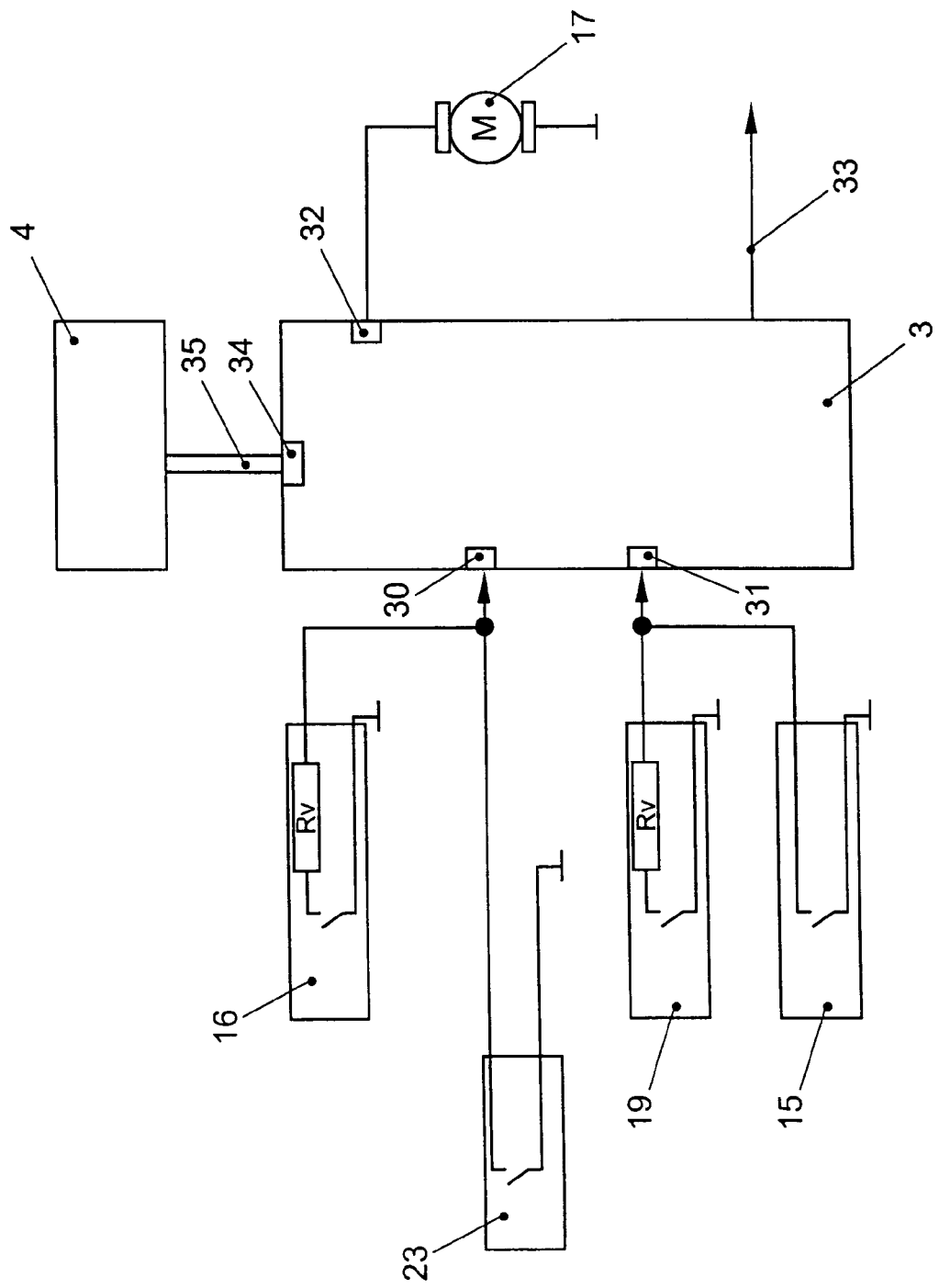
FIG. 3 is a simplified block diagram of the electric circuitry.

FIG. 3 illustrates a simplified block diagram of the electric circuitry. Grip switch 16 of spare-wheel carrier 1 illustrated in FIG. 2 and a grip switch 23 of tailgate 21 illustrated in FIG. 1 are connected to a common port 30 of a control unit 3. In a similar manner, touch-sensitive switch 19 and end switch 15 are connected to a common port 31 of control unit 3. In addition, control unit 3 is connected to actuator 17. In this context, the connection may either be made as shown, via a separate port 32, or via a bus line 33. Control unit 3 is connected, for example, to a control unit of the central locking system via bus line 33. In this context, the common use of each of ports 30, 31 may not be necessary but, as explained below, possible. Grip switch 16 and touch-sensitive switch 19 each are assigned a series resistor Rv, by which the signal is resistance-coded. In this context, the fact that the signals must occur in a certain order during regular operation is utilized. In the locked state of spare-wheel carrier 1, all four switches are initially open. In the first step, a user manipulates grip switch 16, whereby the switch is closed and an operating voltage drops across series resistor Rv. This switching action is detected by control unit 3, and actuator 17 is driven. In this manner, lock 18 illustrated in FIG. 2 is unlocked, and spare-wheel carrier 1 moves into a pre-locking position, which means that switch 19 closes. If no pre-locking position is present, then switch 19 only closes when the user begins to swing spare-wheel carrier open. If the user swings spare-wheel carrier 1 open to a particular angular position, then end switch 15 closes, and the operating voltage is now switched to ground, which is detected, in turn, by control unit 3. If grip switch 23 of tailgate 21 is now closed, then control unit 3 may unblock the tailgate, since control unit 3 detects that spare-wheel carrier 1 is in a non-critical position. Using the occurring order of the signals, control unit 3 may therefore check the operability of the individual elements.

Control unit 3 is connected to further control units of another bus system via port 34. For this purpose, control unit 3 transmits information to an instrument cluster 4 via a bus 35. It is also possible to transmit to a gateway in place of transmitting to an instrument cluster. Bus 35 may be constructed as a 2-wire CAN, a 1-wire LIN, a free communications interface, etc.

As explained above, the position of spare-wheel carrier 1 may not be the only condition for releasing tailgate 21. For example, the enablement of grip switches 16 and/or 23 may be limited in time. For example, grip switches 16, 23 are activated for a certain period of time when a remote radio link sends a signal. In addition, it may be provided that this signal only results in an activation when the ignition key is not inserted, in order to prevent manipulation from the outside. Furthermore, the grip switches may be enabled by an authorized rear-end key, or by manipulating a switch situated in the interior of the motor vehicle, whereby the internal locking system must be switched off. In this context, it may also be provided that the temporal enabling of the grip switches be extended, when, e.g., it is detected that one of the grip switches is being manipulated or the tailgate is in the pre-locking position. The enabling of the grip switches is canceled, for example, after a specifiable time, when the tailgate or rear window is closed from the open state or pre-locking position. In a similar manner, the enablement may be canceled or interrupted, when the vehicle is locked from the outside and no enable signal comes from the interior switch, or the tailgate is locked in the pre-locking position. In addition, the tailgate is blocked when the vehicle moves, i.e., has a speed that is greater than a limiting speed. A further option for blocking the tailgate is an active safety interlock. This blocks both the doors and the tailgate after driving off, and only re-enables them when a door is opened from the inside.

Figure 4A:
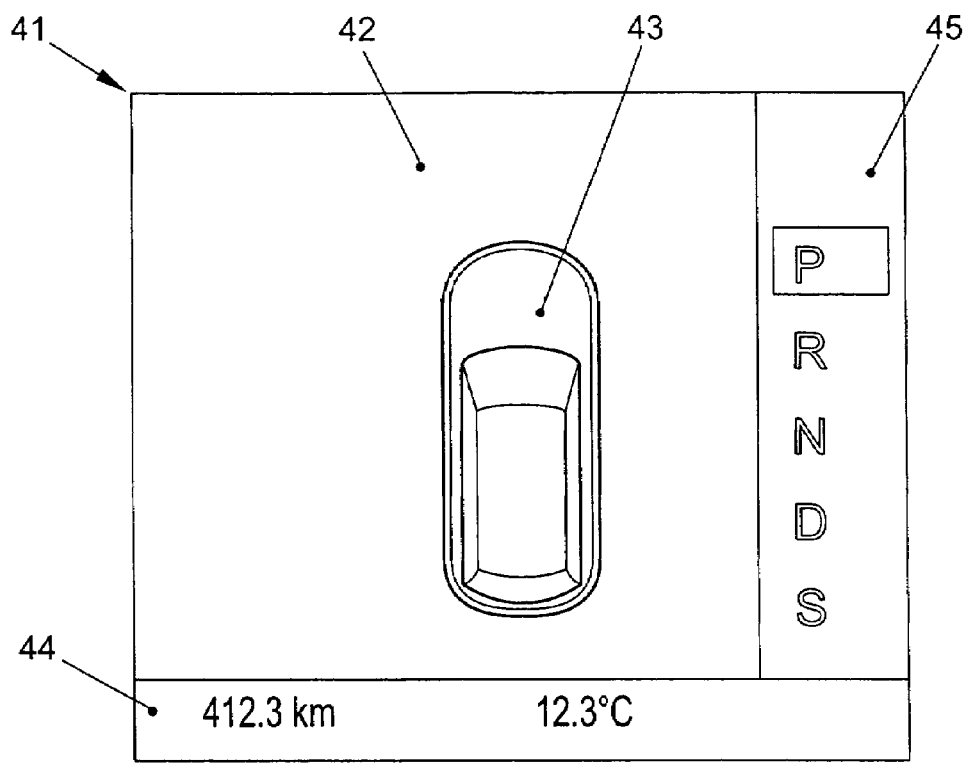
FIG. 4a is a representation of the motor vehicle on a display unit.

FIG. 4a illustrates a display unit 41 for representing the position of a spare-wheel carrier 1 illustrated in FIG. 1. In this context, display unit 4 may be arranged on an instrument cluster illustrated in FIG. 3. Display unit 41 includes at least one field 42, on which a vehicle pictograph 43 is displayable. For example, open vehicle doors, defective vehicle lights, and further information relating to the vehicle, etc., are displayable on the vehicle pictograph. In addition, the display unit includes a display bar 44 for alphanumerically displaying changing information. In the illustrated view, a kilometer reading and an outer temperature are displayed on display bar 44. In addition, it is possible to have a display of an oil temperature, an engine temperature, an interior vehicle temperature, the remaining cruising range, etc. The engaged gear of an automatic shifter or transmission may be deduced, for example, from a second display bar 45.

Figure 4B:
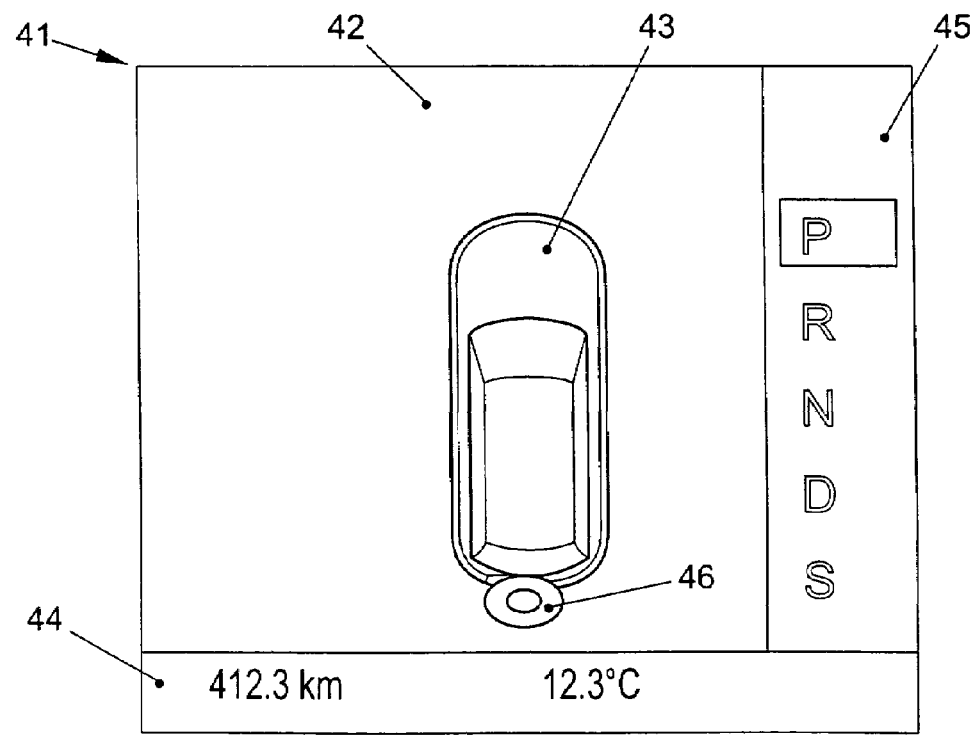
FIG. 4b illustrates a display-unit representation of the motor vehicle having the spare-wheel carrier.

In FIG. 4b, a warning of an open spare-wheel carrier 1 is illustrated on display unit 41. Spare-wheel carrier 1 illustrated in FIG. 1 is assigned a pictograph 46. If spare-wheel carrier 1 is not locked at the rear end of the vehicle, then a user receives a corresponding indication of it on display unit 41, using an illuminated pictograph 46 and/or color markings.

Figure 5:
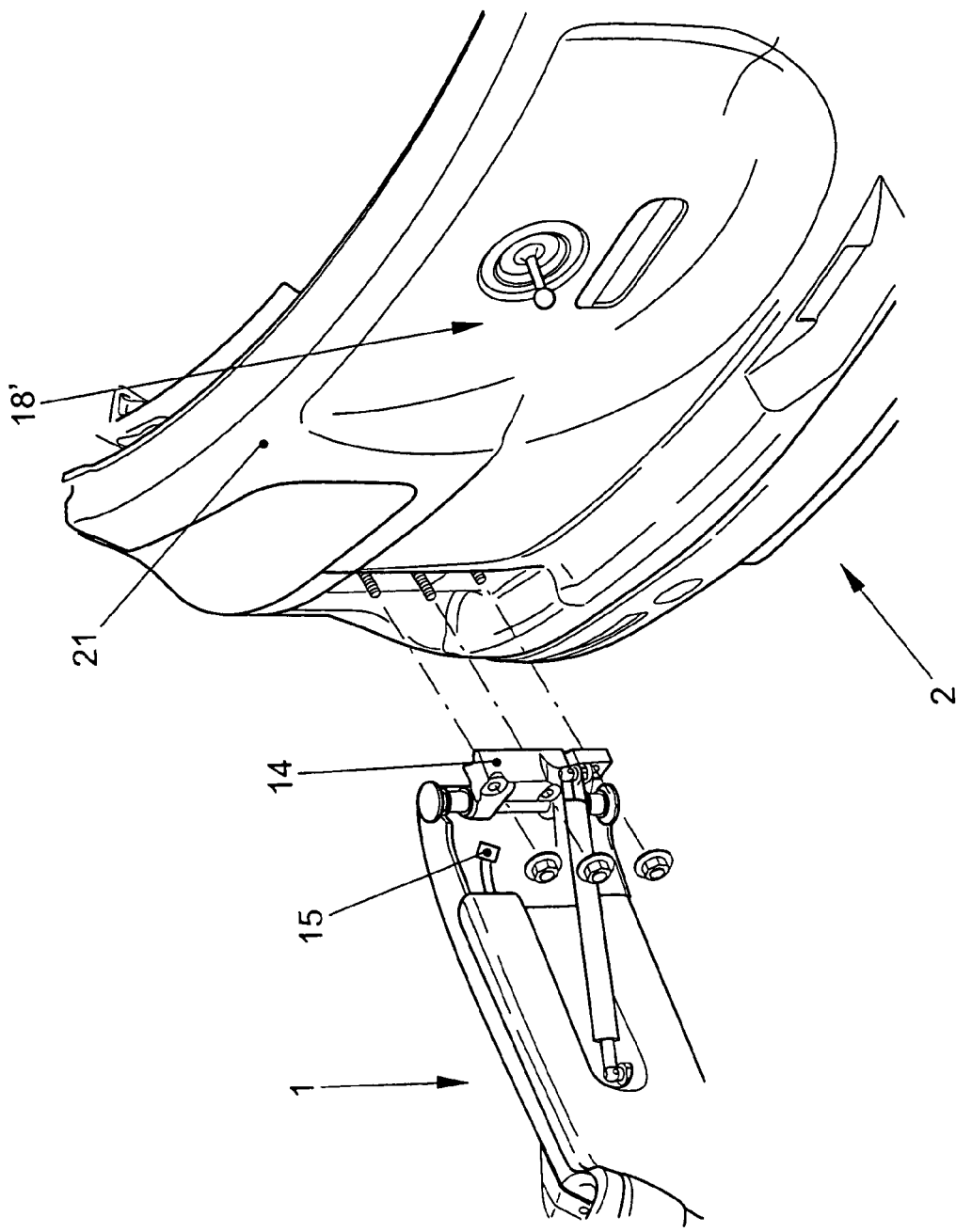
FIG. 5 is an exploded view of the swung-out spare-wheel carrier.

FIG. 5 schematically illustrates an exploded view of vehicle rear end 2 having an opened spare-wheel carrier 1. As previously explained, spare-wheel carrier 1 is locked to tailgate 21 by a lock 18. In this context, lock 18 includes a locking element 18', which is attached to tailgate 21, and a locking element 18", which is attached to spare-wheel carrier 1.

Figure 6:
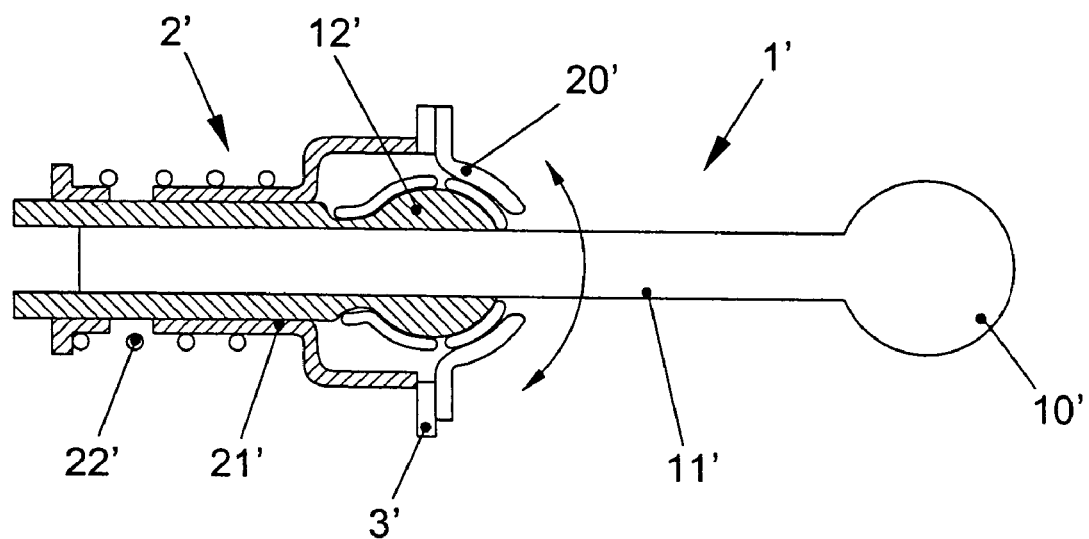
FIG. 6 is a sectional view of the locking element.

Locking element 18' is schematically illustrated in FIG. 6. Locking element 18' includes a striker 1', which is formed by a ball 10' and a pin 11'. Pin 11' is rigidly connected to a bearing ball 12'. Bearing ball 12' is supported in a bearing 2'. Bearing 2' includes a bearing shell 20', which is rigidly connectible to a flange 3' for connection to vehicle tailgate 21, and a movable bearing shell 21', which is movable with respect to bearing shell 20'. Bearing shell 21' is held in the displayed position by a spring 22'. However, striker 1' may be tilted about its transverse axes in opposition to a force of spring 22, in order to compensate for tolerances.

Figure 7:
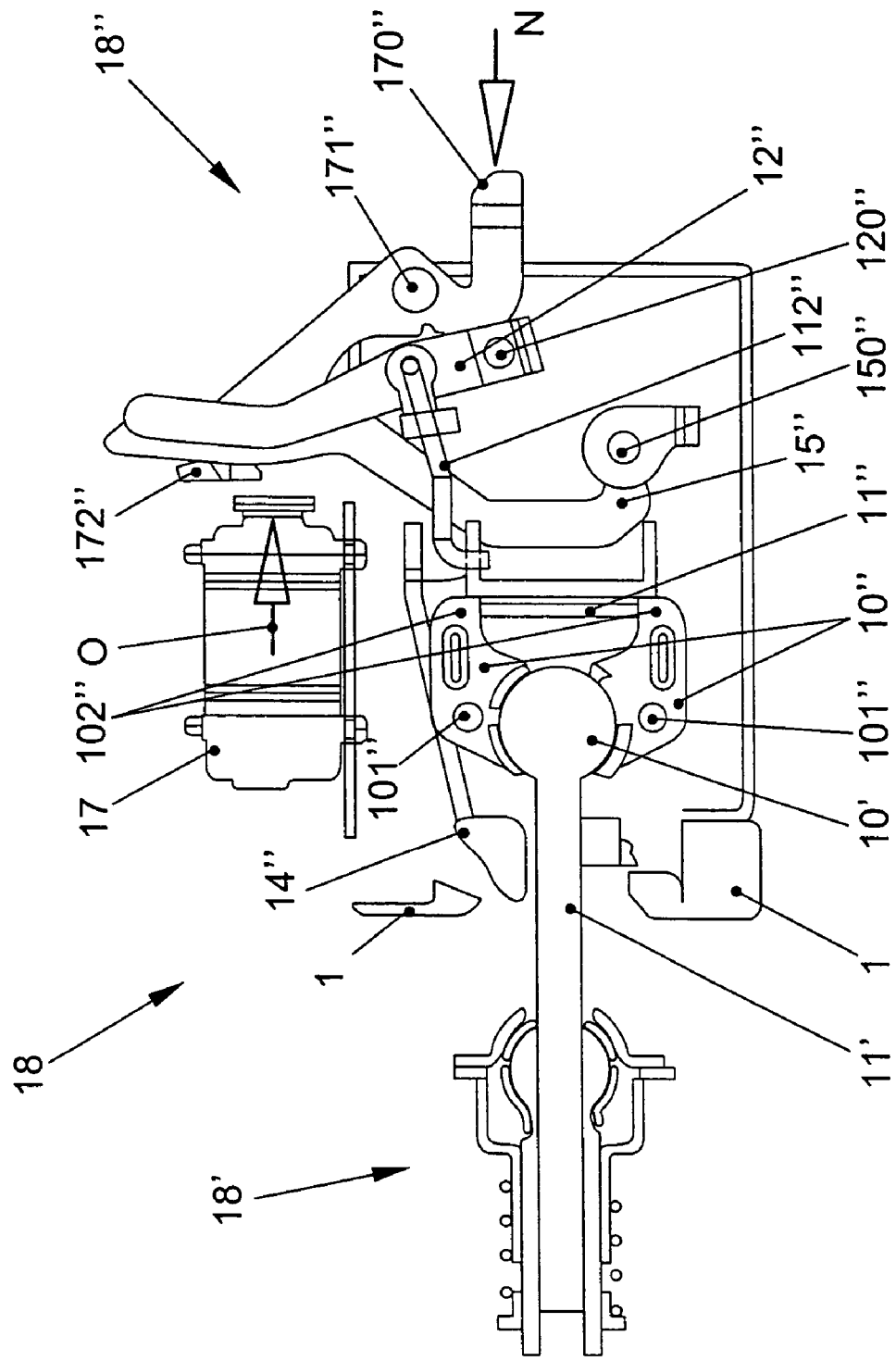
FIG. 7 is a view of a lock.

FIG. 7 schematically shows lock 18, including locking element 18' and locking element 18", which is attached to spare-wheel carrier 1. Ball 10' of striker 1' is accommodated in locking element 18" by two ball sockets 10". Ball sockets 10" may swivel about axes 101". Upon receiving ball 10', they swivel from an open position into the illustrated, closed position. In this context, a blocking part 11" moves between arms 102" of ball sockets 10" in such a manner, that it is not possible for them to swivel back into the open position. If blocking part 11" between arms 102" of ball sockets 10" is removed and/or tilted, then the ball sockets swivel about axes 101" into the open position due to, for example, spring tension, and they consequently release locking element 18'. Locking element 18" may be opened by actuator 17. Blocking part 11" is connected to a lever 12" by rod 112", lever 12" swivelling about an axis 120". For opening, lever 12" is moved by actuator 17 into illustrated arrow direction O. The movement is transmitted by rod 112" to blocking part 11", and in this manner, blocking part 11" between arms 102" of ball sockets 10" is removed.

To increase the safety from spare-wheel carrier 1 swinging out, locking element 18" is arranged to have an additional catch hook 14", the own weight of which opposes the swivelling-back movement of ball sockets 10" about axis 101". Catch hook 14" may be swivelled about an axis 150" by a lever 15". Lever 15" may be moved by actuator 17, as well.

To provide manual releasing and/or additional emergency releasing in response to the failure of actuator 17, locking element 18" is arranged to have an emergency release device. The emergency release system includes a lever 170". A movement of lever 170" in marked direction N causes lever 170" to swivel about an axis 171". Lever 170" has a hook 172", which drives levers 12", 15" during its movement. In this manner, lever 12" is swivelled about its axis 120" and lever 15" is swivelled about its axis 150", and lock 18 is thereby unlocked.

Figure 8:
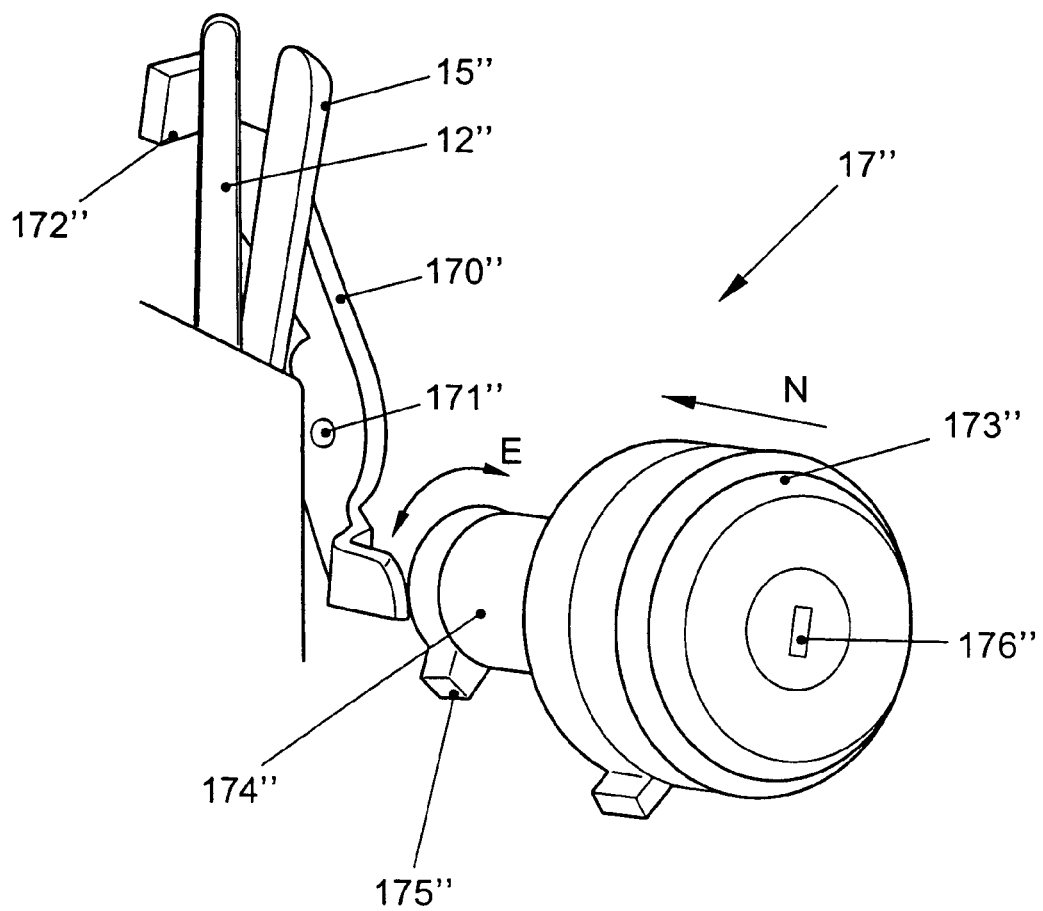
FIG. 8 is a perspective view of an emergency release device.

FIG. 8 illustrates emergency release device 17", which includes lever 170" and an emergency release lock 173" having a striker 174". Emergency release lock 173" has a keyhole 176" and may be unlocked by a key. For example, it may be the vehicle key. The unlocking causes an actuator 175" to rotate in a direction E, so that, when striker 174" is moved in direction N, lever 170" is driven by actuator 175". In this case, lever 170" swivels about axis 171", as described, levers 12", 15" being driven by hook 172". For purposes of locking, actuator 175" is rotated again in direction E. In the locked state, actuator 175" does not depress lever 170" in response to a displacement of striker 174", so that spare-wheel carrier 1 is not released when emergency release device 17" is locked. The key for unlocking the emergency release device may be removable in a locked state only.

What is claimed is:

1. A spare-wheel carrier for a motor vehicle, the spare-wheel carrier pivotable at a body of the motor vehicle and arranged in a region of a tailgate of the motor vehicle, comprising:

at least one sensor configured to detect at least one position of the spare-wheel carrier and to transmit the at least one position to a control unit, the control unit configured to enable and block functions of the motor vehicle in accordance with the position of the spare-wheel carrier, wherein the sensor includes a lock having a touch-sensitive switch configured to detect the position of the spare wheel carrier, the lock configured to retain the position of the spare-wheel carrier;

wherein the lock includes at least one locking element, including a striker having a ball and a pin, and at least one complementary locking element, including at least two swivelable ball sockets, one of the at least one locking element and the at least one complementary locking element attached to the body of the motor vehicle, another one of the at least one locking element and the complementing locking element attached to the spare-wheel carrier; and wherein the lock includes an emergency release device configured to manually release the spare-wheel carrier, the emergency release device including an emergency release lock including a striker having at least one rotatable actuator rotatable into at least one unlocked position and a locked position, in the unlocked position, at least one first lever arranged to release the spare-wheel carrier movable in accordance with displacement of the striker, in the locked position, the at least one first lever not movable in accordance with displacement of the striker.

2. The spare-wheel carrier according to claim 1, further comprising an actuator assigned to the lock, the actuator operable in accordance with a grip switch.

3. The spare-wheel carrier according to claim 1, wherein the ball supports the striker.

4. The spare-wheel carrier according to claim 1, wherein the complementary locking element includes a movable blocking part configured to block swivel of the ball sockets from a closed position into an open position and configured to release the locking element in accordance with at least one of displacement and tilt of the blocking part.

5. The spare-wheel carrier according to claim 1, further comprising a catch hook configured to hold the ball sockets in a closed position in accordance with a weight of the catch hook.

6. The spare-wheel carrier according to claim 1, wherein the locking element includes at least one lever arranged as a release mechanism.

7. The spare-wheel carrier according to claim 1, wherein the emergency release device includes at least one second lever positioned to operate the at least one first lever.

8. The spare-wheel carrier according to claim 1, further comprising:
an arrangement configured to block operation of a rear window in accordance with the lock.

9. The spare-wheel carrier according to claim 1, further comprising a display unit configured to represent the position of the spare-wheel carrier.

10. The spare-wheel carrier according to claim 9, wherein the display unit is arranged in an instrument cluster.

11. The spare-wheel carrier according to claim 1, further comprising:
at least one bearing arranged on the body; and
an end switch assigned to the at least one bearing.

12. The spare-wheel carrier according to claim 11, further comprising a grip switch assigned to the tailgate, the tailgate operable as a function of the position of the spare-wheel carrier detected by the end switch.

* * * * *

UNITED STATES PATENT AND TRADEMARK OFFICE
CERTIFICATE OF CORRECTION

| | |
|---|---|
| PATENT NO. | : 7,389,898 B2 |
| APPLICATION NO. | : 10/671927 |
| DATED | : June 24, 2008 |
| INVENTOR(S) | : Holger Riemer et al. |

It is certified that error appears in the above-identified patent and that said Letters Patent is hereby corrected as shown below:

Title page:

Item (73) Assignee, change the spelling of the assignee from "Volkswagon AG" to --Volkswagen AG--.

Signed and Sealed this

Ninth Day of September, 2008

JON W. DUDAS
*Director of the United States Patent and Trademark Office*